United States Patent [19]

Rebentisch

[11] Patent Number: 4,616,799

[45] Date of Patent: Oct. 14, 1986

[54] AUTOMATIC RECOVERY SWING SIGN STRUCTURE

[75] Inventor: Hugo E. Rebentisch, Wayne, Mich.

[73] Assignee: GTE Products Corporation, Stamford, Conn.

[21] Appl. No.: 786,164

[22] Filed: Oct. 9, 1985

Related U.S. Application Data

[63] Continuation of Ser. No. 603,801, Apr. 25, 1984, abandoned.

[51] Int. Cl.⁴ ............................................. F16F 1/14
[52] U.S. Cl. ................................ 248/289.3; 248/145; 248/900; 248/608; 16/308; 16/280
[58] Field of Search ..................... 248/289.3, 145, 900, 248/608; 16/308, 280

[56] References Cited

U.S. PATENT DOCUMENTS

| | | | |
|---|---|---|---|
| 251,591 | 12/1881 | Jaeger | 16/308 |
| 839,607 | 12/1906 | Lanier | 248/145 |
| 865,243 | 9/1907 | Dunn | 248/289.3 |
| 964,801 | 7/1910 | Martin | 49/386 |
| 2,279,622 | 4/1942 | Hurd | 248/145 |
| 2,509,424 | 5/1950 | Denton | 248/495 |
| 2,602,957 | 7/1952 | Anderson | 49/386 |
| 2,787,433 | 4/1957 | Slavsky | 248/289.3 |
| 3,637,178 | 1/1972 | Golden | 248/145 |
| 3,699,615 | 10/1972 | Duncan | 16/308 |
| 4,218,036 | 8/1980 | Pitkanen | 248/900 |

FOREIGN PATENT DOCUMENTS

1017535 12/1952 France ................................. 16/308

*Primary Examiner*—Reinaldo P. Machado
*Assistant Examiner*—Alvin Chin-Shue
*Attorney, Agent, or Firm*—Ivan L. Ericson

[57] ABSTRACT

A yieldable highway swing sign is described which swings out of the way when struck by farm equipment or other objects such as wet snow from snow plows. The sign has a torsion bar which returns the sign to its original position after being struck. The sign has notches in its hinges to maintain its original position. The notches resist any displacement forces by providing an inclined plane of 40° which must be overcome before the sign is displaced in an arc pivoting around the torsion bar. The displacement of the sign is limited to a 90° displacement from the original position by the configuration of the hinges and is helped by the increased torque created by the torsion bar as the sign swings further from its original position.

8 Claims, 14 Drawing Figures

AUTOMATIC RECOVERY SWING SIGN STRUCTURE

This is a continuation of co-pending application Ser. No. 603,801 filed on Apr. 25, 1984 and now abandoned.

FIELD OF THE INVENTION

This invention relates to yieldable structures. More particularly, this invention relates to yieldable swing sign structures which recover automatically.

BACKGROUND OF THE INVENTION

On vehicle roadways, particularly in areas where roadways are covered with snow for a part of the year, a continuing problem is the damage and destruction of highway signs and delineators situated at the side of the road for the guidance and warning of passing motorists. Of necessity such signs and delineators must be in close proximity to the roadway so that they can be readily observed by passing motorists. Because of their proximity to the edge of the road they are subject to damage by weed mowers, snow plows and occasionaily by automobiles.

A specific example is where signs are located by narrow one-lane bridges along rural roads that have concrete railings or abutments on both sides. Highway department standards in some states require that one foot by three foot reflective markers be installed directly above these concrete abutments. Because various farm equipment is wider than the space between these markers, the markers many times are knocked down whenever the equipment goes over the bridges. Also, snow plows blast heavy snow against these markers causing the markers to become so bent or twisted that they are no longer readable by approaching motorists. In some areas as many as 15 percent of all rural signs require repair each spring because of the damage inflicted during the winter.

These problems have been around for many years and because of the expense of procuring, installing and replacing roadway markers, the need to solve these problems is great. The prior art teaches various solutions to these problems but because of various reasons, i.e., too costly, poor maintenance and impracticality, they have not been widely accepted.

SUMMARY OF THE INVENTION

In accordance with the present invention, a new and improved yieldable structure is described.

The yieldable structure comprises a yieldable member and a support member for supporting the yieldable member. The support member is substantially parallel to the yieldable member. The yieldable structure has a pivoting mechanism fixed to the support member and the yieldable member for pivoting the yieldable member. The pivoting mechanism has a pivotal axis about which the yieldable member pivots. The yieldable structure also has a positioning mechanism for positioning the yieldable member in a selected position in relationship to the support member. The yieldable structure has a pivot limiting mechanism for limiting the displacement of the yieldable member from the selected position in relationship to the support member. The yieldable structure has a torsion mechanism which coacts with the support member and the yieldable member for providing a force to resist displacement of the yieldable member from the selected position. The torsion mechanism coacts axially through the pivotal axis of the pivoting mechanism. A first portion of the torsion mechanism is substantially parallel to the yieldable member and the support member.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

Figure 1:
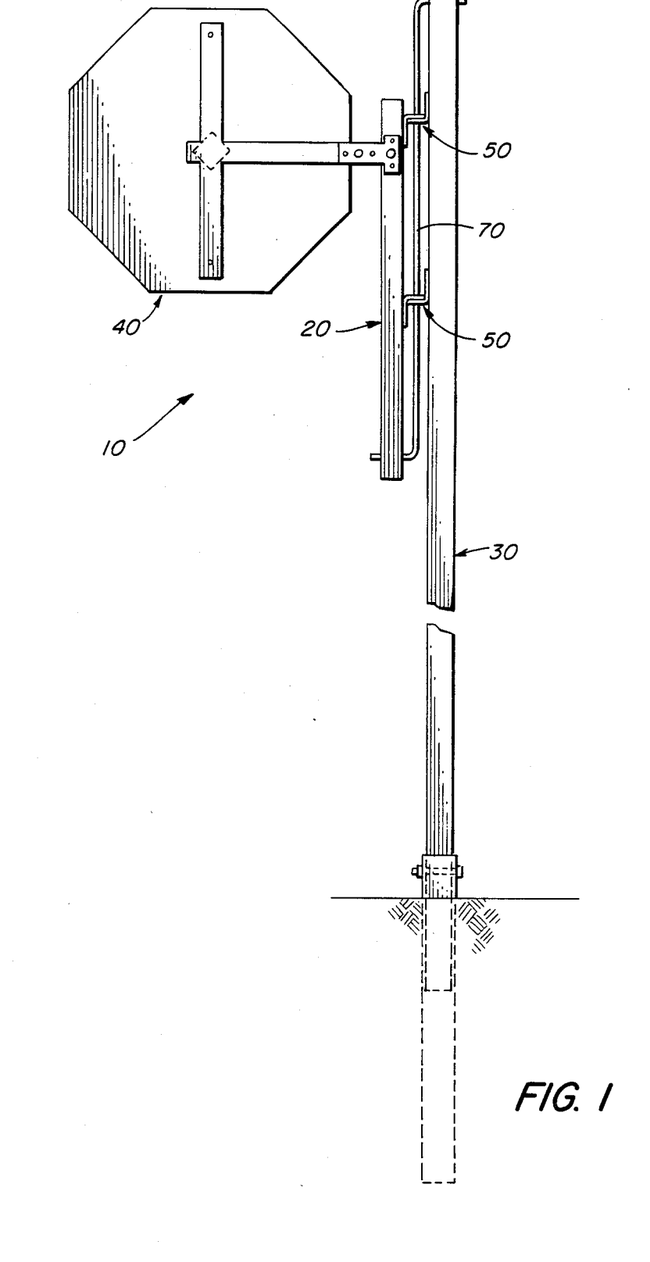
FIG. 1 is an illustration of a highway sign in accordance with the present invention.
Figure 2:
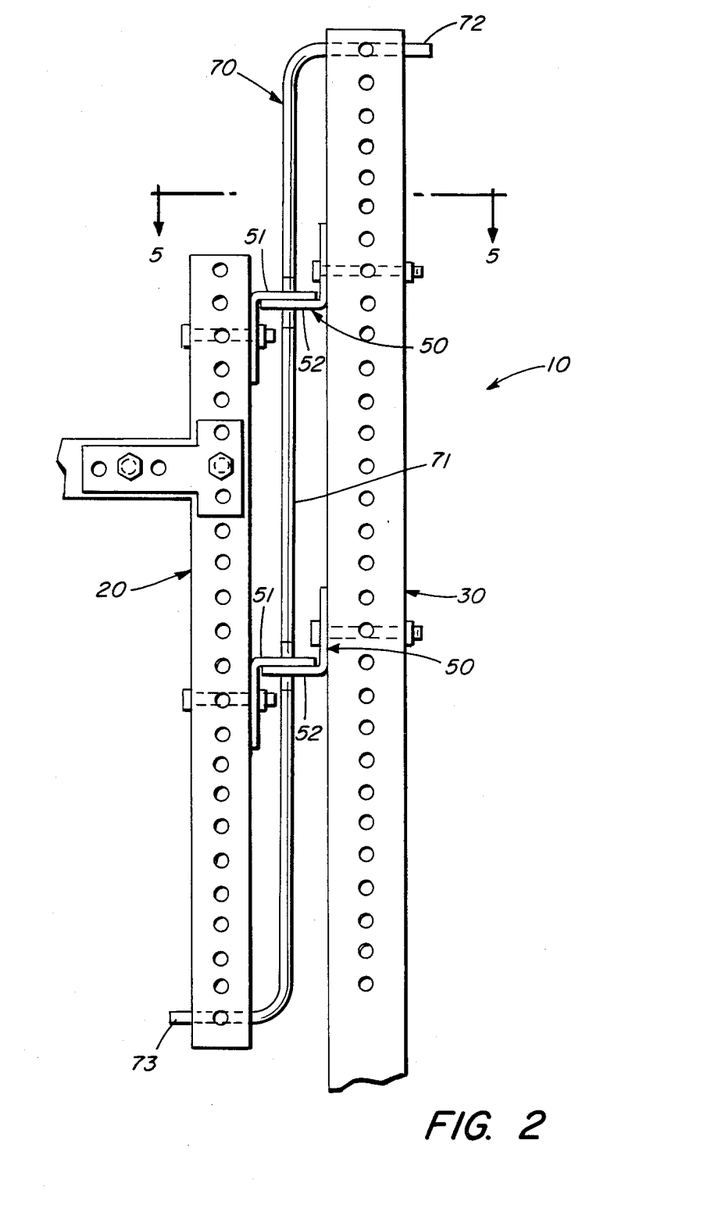
FIG. 2 is a detail of the highway sign illustrated in FIG. 1.
Figure 3:
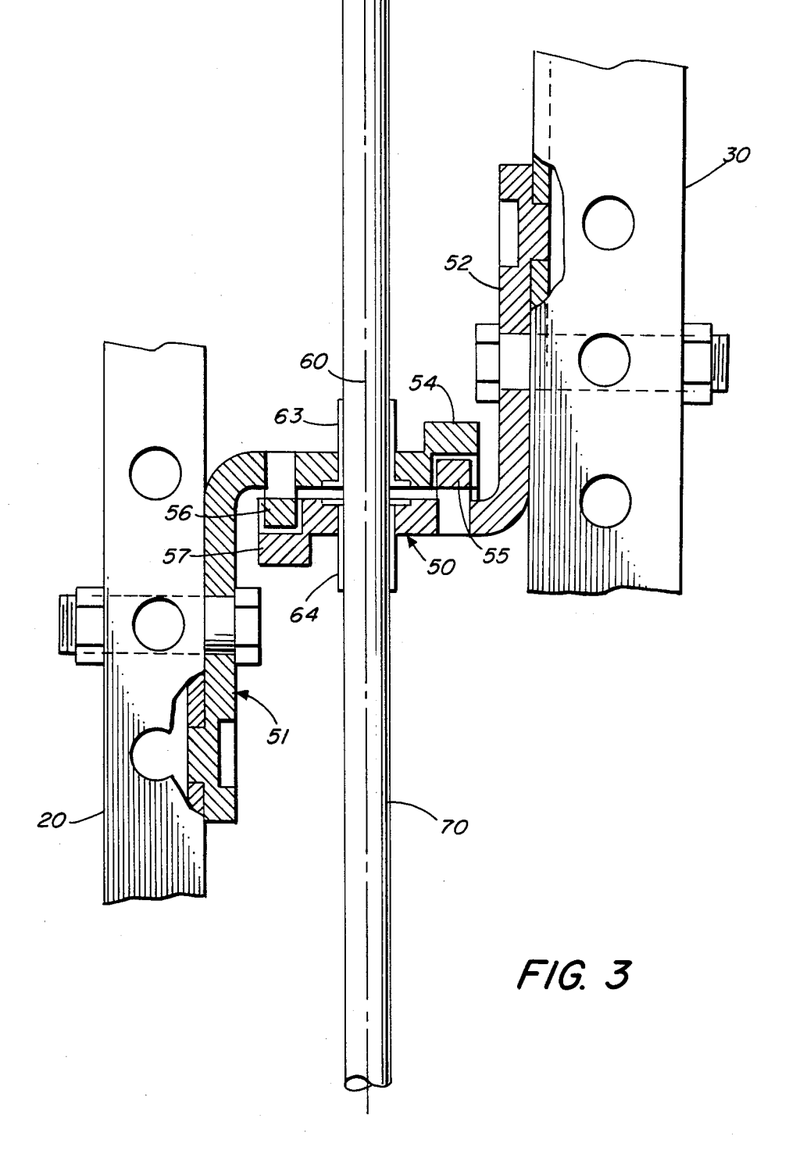
FIG. 3 is a cross section representation of the pivoting mechanism showing the torsion bar in accordance with the present invention.

As shown in FIG. 1 is an illustration of a yieldable structure 10 employed for supporting a highway sign. The structure 10 comprises a yieldable member 20 and a support member 30 for supporting the yieldable member 20. The yieldable member 20 is a frame with a highway sign 40 attached. The support member 30 is substantially vertical and elongated and the yieldable member 20 is substantially parallel to the support member 30. The structure 10 has two pivoting mechanisms 50. The pivoting mechanism 50 has two parts, a first "L" shaped portion 51 having a first opening 84 and a second "L" shaped portion 52 having a second opening 85 shown in FIGS. 2, 3, 4c and 4d. The first "L" shaped portion 51 is fixed to the yieldable member 20 and coacts with the second "L" shaped portion 52. The second "L" shaped portion 52 is fixed to the support member 30 and coacts with the first "L" shaped portion 51 as shown in FIGS. 2 and 3. The combination of the first "L" shaped pivot member 51 coacting with the second "L" shaped pivot member 52 comprise the pivoting mechanism 50. The pivoting mechanism 50 has a pivotal axis 60 shown in FIG. 3. The first "L" shaped pivot member 51 and the second "L" shaped portion 52 shown in FIG. 3 have the same pivotal axis 60 as the pivoting mechanism 50.

Figure 4A:
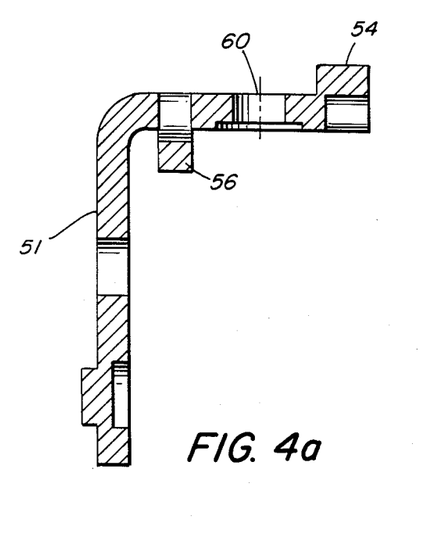
FIGS. 4a, 4b, 4c and 4d are representations of the pivoting mechanism illustrated in FIGS. 1, 2 and 3 in accordance with the present invention.
Figure 4B:
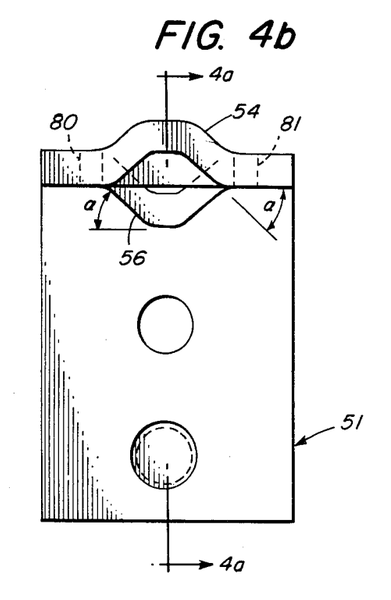
Figure 4C:
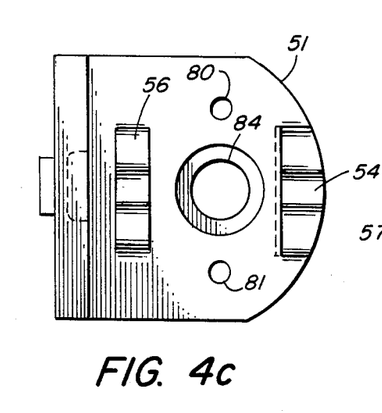
Figure 4D:
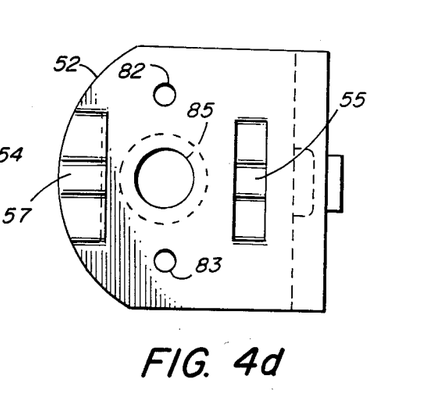
Figure 5:
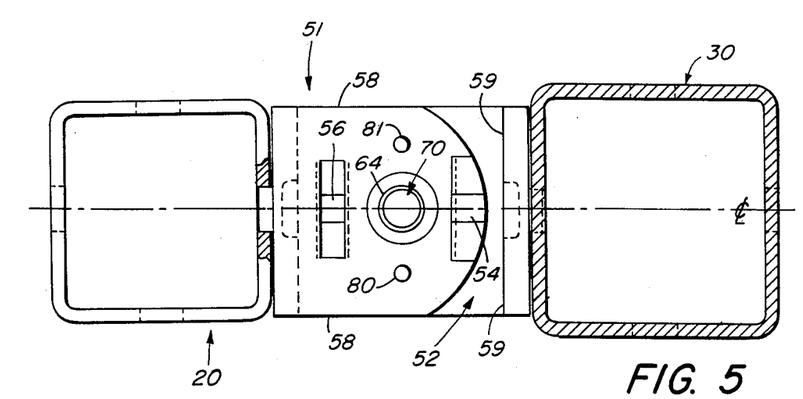
FIG. 5 is a planar view of the yieldable member and the support member in the selected position in accordance with the present invention.
Figure 6:
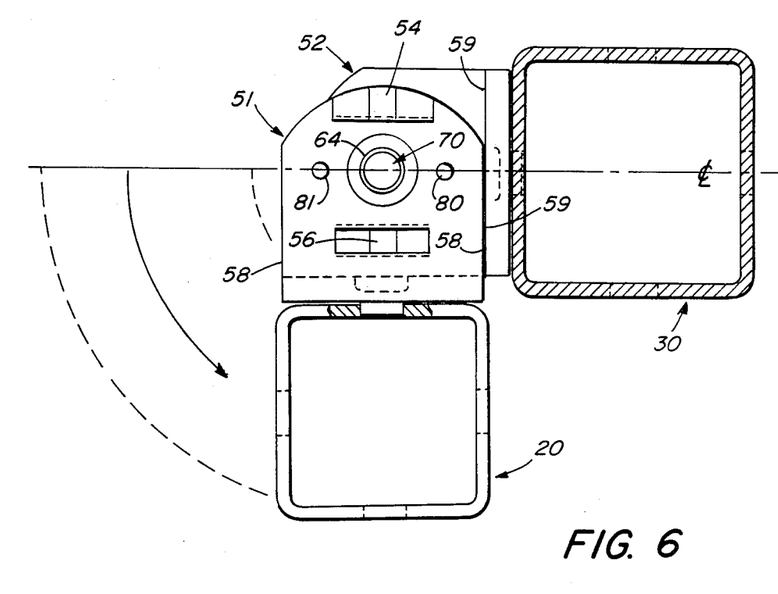
FIG. 6 is a planar view of the yieldable member displaced to the limit of its rotation about the pivoting mechanism in accordance with the present invention.

The first "L" shaped pivot member 51 and the second "L" shaped pivot member 52 have bearings 63 and 64 through which a torsion bar 70 passes as illustrated in FIG. 3. The torsion bar 70 acts like a hinge pin for the pivot mechanism 50 as well as resisting a radial displacement of the yieldable member 20 and resisting an axial displacement of the yieldable member 20 in relation to the support member 30. The first "L" shaped pivot member 51 and the second "L" shaped member 52 have positioning notches 54, 55, 56 and 57 shown in FIG. 3. FIGS. 4a, 4b and 4c illustrate the positioning notches 54 and 56 of the first "L" shaped pivot member 51. The first "L" shaped pivot member 51 shown in FIG. 4c is the same as the second "L" shaped pivot member 52 illustrated in FIG. 4d. The notches 54, 55, 56 and 57 all are made to impose an angle α of 40° from the horizontal plane of the pivot members 51 and 52. Shown in FIG. 4b are the notches 54 and 56 illustrating the 40° angle. The coacting of notches 54 and 56 with notches 55 and 57 respectively determine a selected position which the yieldable member 20 has with respect to the support member 30, illustrated in FIG. 5. Whenever a force, having a horizontal vector great enough, is applied to the yieldable member 20, the notches 54 and 56 lift out of notches 55 and 57 respectively shown in FIG. 3 by sliding along an inclined plane having the 40° angle α shown in FIG. 4b. Once the notches 54 and 56 are lifted out of notches 55 and 57 the yieldable member 20 is free to be displaced carrying the highway sign 40 attached thereto in an arc pivoting about the torsion bar 70 which passes through the pivotal axis 60 of the pivot mechanism 50 shown in FIG. 3. The torsion bar 70 resists the displacement force with a torsion force of its own. The torsion force increases the greater the displacement distance from the original selected position. The yieldable member 20 can be displaced through an arc up to but not exceeding a pre-determined position, such as 90°, from the selected position if sufficient force is applied. Rotation limiting mechanism 58 and 59, shown in FIG. 5 and 6, limit the displacement of the yieldable member 20. One of the rotation limiting mechanisms 58 located on one side of the first "L" shaped pivot member 51 coacts with one of the rotation limiting mechanisms 59 located on the inside face of the second "L" shaped pivot member 52 when the yieldable member 20 traverses an arc of 90° from the selection position; thereby, preventing the yieldable member 20 from proceeding past the 90° position in respect to its original selected position. Once the force which displaced the yieldable member 20 has been removed or reduced sufficiently for the resisting torsion force of the torsion bar 70 to overcome the displacement force the yieldable member 20 will be returned to its original selected position by the resisting torsion force of the torsion bar 70. The resisting torsion force decreases as the yieldable member 20 comes closer to its original selected position and reduces to zero once the yieldable member 20 reaches the selected position.

The pivoting mechanism 50 may have shear pin apertures 80 and 81 located in the first "L" shaped pivot member 51 and shear pin apertures 82 and 83 located in the second "L" shaped pivot member 52 to provide an alternative means for increasing the resistance to initial displacement of the yieldable member 20. This is accomplished by placing shear pins in the apertures 80 and 81 aligned with apertures 82 and 83. Shear pins of different shear forces can be utilized to permit design variations.

Figure 7:
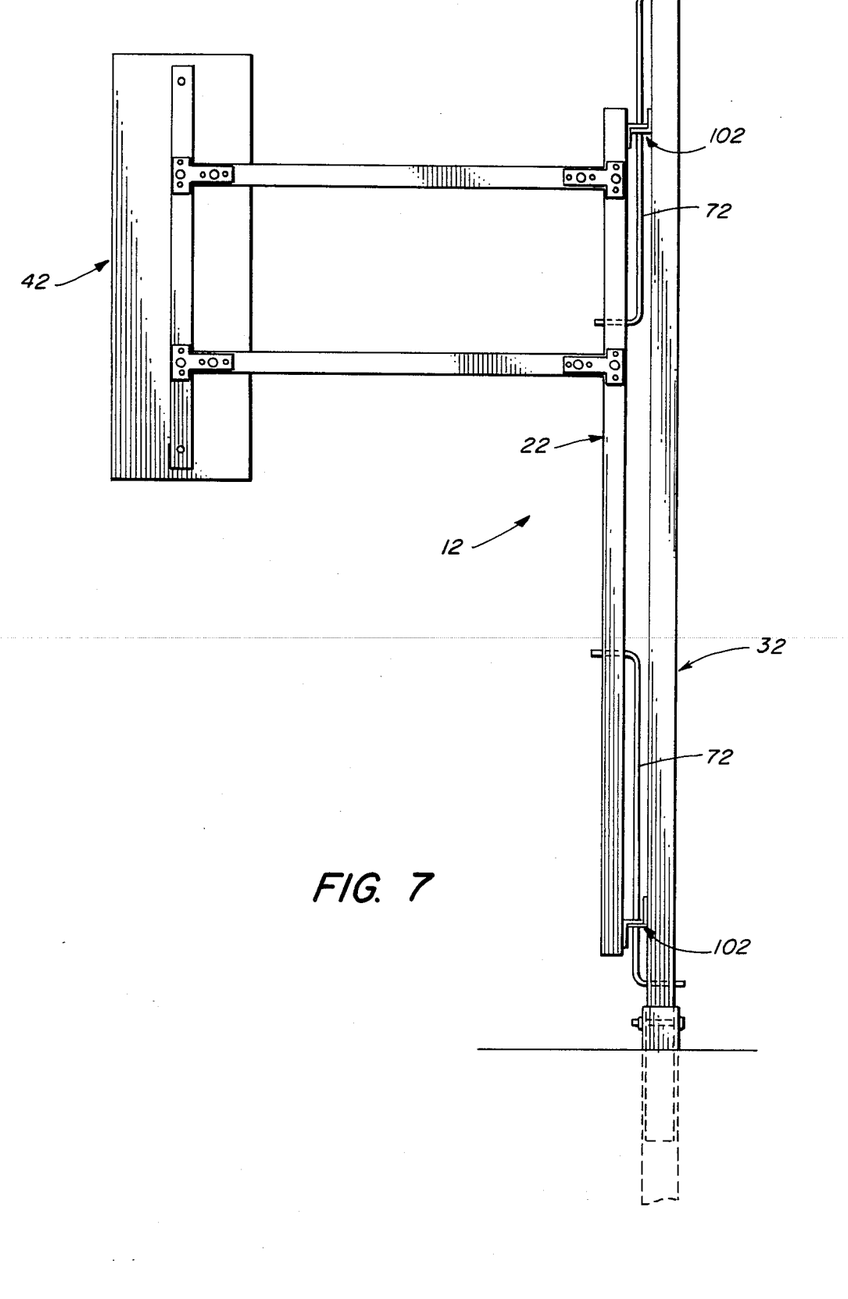
FIG. 7 is an illustration of a second embodiment of a highway sign in accordance with the present invention.
Figure 8:
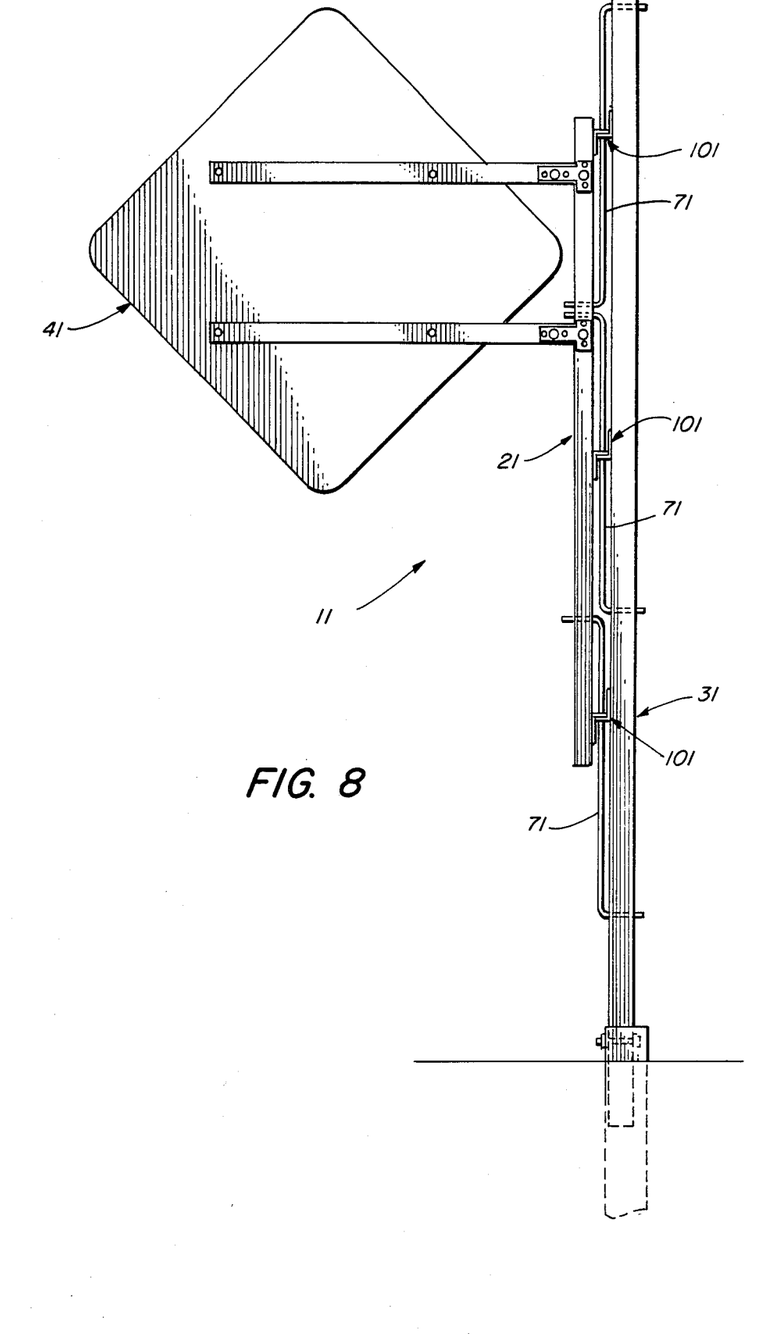
FIG. 8 is an illustration of a third embodiment of a highway sign in accordance with the present invention.

The torsion bar 70 has a first portion 71 which is substantially parallel to the support member 30 and the yieldable member 20 as illustrated in FIG. 2. The torsion bar 70 has a second portion 72 and a third portion 73, shown in FIG. 2, which are substantially perpendicular to the first portion 71, the yieldable member 20 and the support member 30. This configuration imparts a general "S" shape to the torsion bar 70. The second portion 72 coacts with the support member 30 and the third portion 73 coacts with the yieldable member 20 shown in FIG. 2 so whenever the yieldable member 20 is displaced from the selected position a torque is created in the torsion bar 70 which provides the torsion force to resist the displacement of the yieldable member 20. The general "S" shape of the torsion bar 70 also resists any axial displacement of the yieldable member 20 from the support member 30 by the coacting of the second portion 72 with the support member 30 and the coacting of the third portion 73 with the yieldable member 20. The resistance to an axial displacement helps maintain the engagement of notches 54 and 56 with corresponding notches 55 and 57. The length of torsion bar 70 can be changed to increase or decrease the torque required depending upon the design, the size, and weight of the yieldable member 20. As shown in FIG. 7 and 8, different highway signs may require more than one torsion bar. Shown in FIG. 7 is a second embodiment of a yieldable structure 12 having a support member 32, a yieldable member 22, two torsion mechanisms 72, two pivoting mechanisms 102 and a highway sign 42. Shown in FIG. 8 is a third embodiment of a yieldable structure 11, having a support member 31, a yieldable member 21, three torsion mechanisms 71, three pivoting mechanisms 101 and a highway sign 41. By changing the number of torsion bars and, or the length of the bars, a great variety of designs and variables may be incorporated into the same basic support member, yieldable member and pivoting mechanisms.

Figure 9:
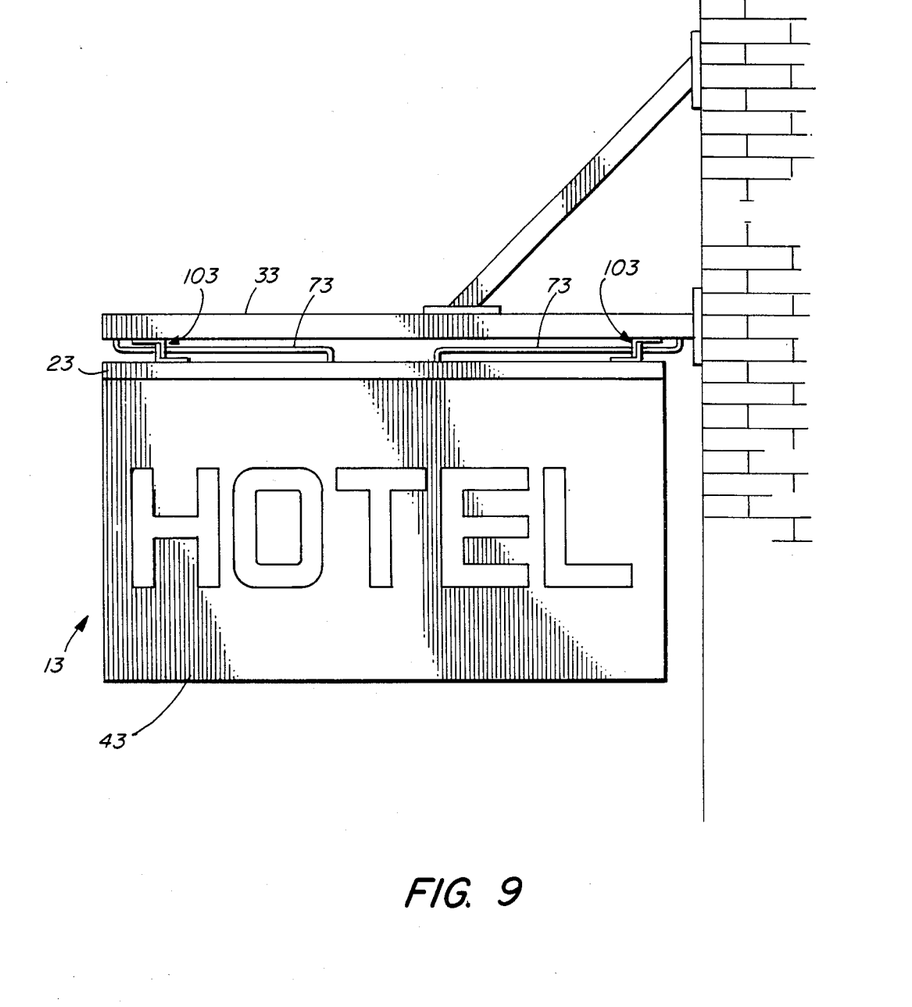
FIG. 9 is an illustration of a horizontal sign in accordance with the present invention.
Figures 10A, 10B:
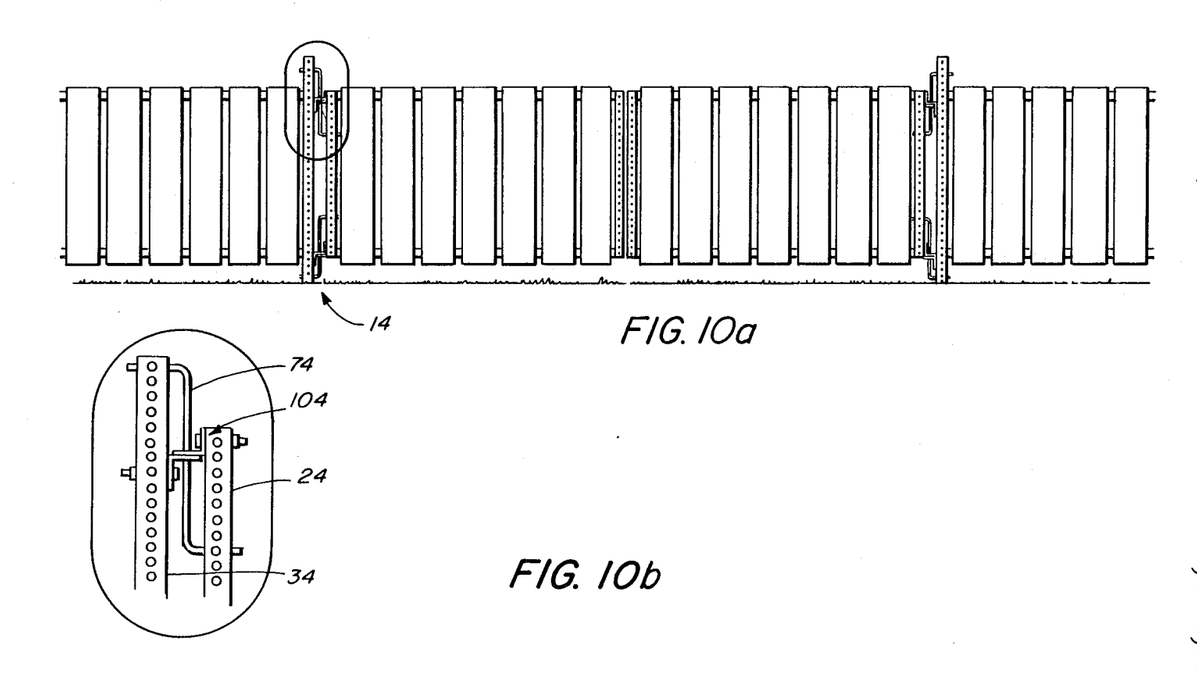
FIGS. 10a and 10b illustrate a swing gate in accordance with the present invention with detail shown in FIG. 10b.

In accordance with the invention the yieldable structure can also be used to make horizontally supported signs as shown in FIG. 9. Illustrated in FIG. 9 is a horizontal structure 13 having a horizontal support member 33, a horizontal yieldable member 23, two torsion mechanisms 73, two pivoting mechanisms 103 and a sign 43. It can also be used to make yieldable mail box supports, yieldable display signs, swing gates, or any application where a supported frame is displaced in an arc about a vertical or horizontal support member by a force having a horizontal vector. FIG. 10a illustrates an example of how the instant invention can be used to make a swing gate 14 having a support member 34, a yieldable member 24, a torsion mechanism 74 and a pivoting mechanism 104 as shown in FIG. 10b.

While there has been shown and described what is at present considered the preferred embodiment of the invention, it will be obvious to those skilled in the art that various changes and modifications may be made therein without departing from the scope of the invention as defined by the appended claims.

What is claimed is:

1. A yieldable structure comprising
a yieldable member;
support member for supporting said yieldable member, said yieldable member being substantially parallel to said support member;
pivoting means coacting with said support member and said yieldable member for pivoting said yieldable member pivots, said pivoting means having one pivotal axis about which said yieldable member, said yieldable member pivoting about said pivotal axis, said pivotal axis being substantially parallel to said support member;

positioning means for positioning said yieldable member in a selected position in relationship to said support member;

limiting means for limiting the displacement of said yieldable member from the selected position in relationship to said support member and for maintaining said yieldable member at said selected position under a given force and yielding from said selected position when said force is exceeded, said pivoting means comprising said positioning means and said limiting means; and torsion means coacting with said support member and said yieldable member for resisting a radial displacement of said yieldable member from said selected position, said torsion means coacting axially through said pivotal axis of said pivoting means providing a center of rotation for said pivoting means, a first portion of said torsion means being substantially parallel to said yieldable means and said support member, said first portion of said torsion means acting like a hinge pin for said pivoting means, and said torsion means resisting an axial displacement of said yieldable member in relation to said support member.

2. A yieldable structure in accordance with claim 1 wherein said torsion means has a second portion and a third portion being substantially perpendicular to said first portion, said yieldable member, and said support member; said second portion coacts with said support member, and said third portion coacts with said yieldable member.

3. A yieldable structure in accordance with claim 2 wherein said torsion means is a generally "S" shaped torsion bar.

4. A yieldable structure in accordance with claim 1 wherein said yieldable member is a frame with a highway sign attached.

5. A yieldable structure in accordance with claim 1 wherein said pivoting means includes a first "L" shaped portion and a second "L" shaped portion.

6. A yieldable structure in accordance with claim 5 wherein said positioning means includes notches in said first "L" shaped portion and in said second "L" shaped portion.

7. A yieldable structure in accordance with claim 1 wherein said support member is essentially vertical.

8. A yieldable structure in accordance with claim 1 wherein said support member is essentially horizontal.

* * * * *